US012125085B2

(12) United States Patent
Young

(10) Patent No.: US 12,125,085 B2
(45) Date of Patent: Oct. 22, 2024

(54) SYSTEMS, METHODS, AND APPARATUSES FOR MULTI-TIERED ELECTRONIC PLATFORMS FOR ELECTRONIC MARKETPLACES

(71) Applicant: ACCESS TODO LLC, Atlanta, GA (US)

(72) Inventor: Gabriel Young, Atlanta, GA (US)

(73) Assignee: Access Todo LLC, Atlanta, GA (US)

( * ) Notice: Subject to any disclaimer, the term of this patent is extended or adjusted under 35 U.S.C. 154(b) by 0 days.

(21) Appl. No.: 18/250,619

(22) PCT Filed: Oct. 29, 2021

(86) PCT No.: PCT/US2021/057234
§ 371 (c)(1),
(2) Date: Apr. 26, 2023

(87) PCT Pub. No.: WO2022/094202
PCT Pub. Date: May 5, 2022

(65) Prior Publication Data
US 2023/0401596 A1   Dec. 14, 2023

Related U.S. Application Data

(60) Provisional application No. 63/107,939, filed on Oct. 30, 2020.

(51) Int. Cl.
*G06Q 30/00*  (2023.01)
*G06Q 30/0214* (2023.01)
(Continued)

(52) U.S. Cl.
CPC ..... *G06Q 30/0613* (2013.01); *G06Q 30/0214* (2013.01); *G06Q 30/04* (2013.01)

(58) Field of Classification Search
CPC ............ G06Q 30/0214; G06Q 30/04
See application file for complete search history.

(56) References Cited

U.S. PATENT DOCUMENTS

| 7,747,497 B1 * | 6/2010 | Rymer | G06Q 40/06 |
| | | | 705/35 |
| 2002/0007327 A1 * | 1/2002 | Steury | G06Q 20/20 |
| | | | 705/34 |

(Continued)

FOREIGN PATENT DOCUMENTS

JP      2004-118632 A     4/2004

OTHER PUBLICATIONS

Tian, Lin and Vakharia, Asoo and Tan, Yinliang and Xu, Yifan, Marketplace, Reseller, or Hybrid: A Strategic Analysis of Emerging E-Commerce Model (Apr. 20, 2018). Production and Operations Management, 27(8), 2018, 1595-1610, Available at SSRN: https://ssrn.com/abstract=2737560 (Year: 2018) (Year: 2018).*

(Continued)

*Primary Examiner* — Sun M Li
(74) *Attorney, Agent, or Firm* — BakerHostetler

(57) ABSTRACT

Systems, methods, and apparatuses are described for determining one or more referrals associated with an electronic marketplace. Search results of a search to a user device responsive to receiving the search from the user device for a product(s) or service(s) associated with an electronic marketplace platform may be transmitted. A selection, from the user device, of a product(s) or service(s) associated with the search results may be received. A service fee(s) for a transaction(s) associated with the selected product(s) or service(s) may be determined. A referral fee(s), based on the service fee(s), responsive to determining that one or more entities referred the product(s) or service(s) associated with the transaction(s) may be determined. A level(s) assigned to each of the one or more entities and a predetermined referral (Continued)

fee percentage(s), based on the service fee(s), for the level(s) assigned to each of the one or more entities may be determined.

19 Claims, 5 Drawing Sheets

(51) Int. Cl.
*G06Q 30/04* (2012.01)
*G06Q 30/0601* (2023.01)

(56) References Cited

U.S. PATENT DOCUMENTS

| | | | | |
|---|---|---|---|---|
| 2008/0208689 | A1* | 8/2008 | Johnson | G06Q 20/04 |
| | | | | 705/14.27 |
| 2008/0300991 | A1* | 12/2008 | Openiano | G06Q 30/0214 |
| | | | | 705/14.34 |
| 2009/0125426 | A1* | 5/2009 | Bishop | G06Q 20/40 |
| | | | | 705/34 |
| 2009/0307158 | A1 | 12/2009 | Kim et al. | |
| 2010/0106576 | A1* | 4/2010 | Etheredge | G06Q 30/02 |
| | | | | 235/375 |
| 2012/0296718 | A1* | 11/2012 | Kennedy | G06Q 30/06 |
| | | | | 705/14.16 |
| 2014/0214507 | A1* | 7/2014 | Estes | G06Q 30/0214 |
| | | | | 705/14.16 |
| 2016/0034937 | A1* | 2/2016 | Nickerson | G06Q 30/0214 |
| | | | | 705/14.16 |
| 2016/0180386 | A1* | 6/2016 | Konig | G06Q 30/0255 |
| | | | | 705/14.55 |
| 2018/0357656 | A1* | 12/2018 | Courtot | G06Q 30/0611 |
| 2019/0318337 | A1 | 10/2019 | Schulz et al. | |
| 2019/0347685 | A1 | 11/2019 | Glazier et al. | |

OTHER PUBLICATIONS

N. S. Caswell, C. Nikolaou, J. Sairamesh, M. Bitsaki, G. D. Koutras and G. Iacovidis, "Estimating value in service systems: A case study of a repair service system," in IBM Systems Journal, vol. 47, No. 1, pp. 87-100, 2008, doi: 10.1147/sj.471.0087. (Year: 2008).*

M. Karaliopoulos and I. Koutsopoulos, Collective Subscriptions: A Novel Funding Tool for Crowdsourced Network Infrastructures, 2020 IEEE 21st International Symposium on "A World of Wireless, Mobile and Multimedia Networks" (WoWMoM),Cork, Ireland, 2020, pp. 287-296, doi: 10.1109/WoWMoM49955.2020.00057 (Year: 2020).*

N. S. Caswell, C. Nikolaou, J. Sairamesh, M. Bitsaki, G. D. Koutras and G. Iacovidis, "Estimating value in service systems: A case study of a repair service system," in IBM Systems Journal, vol. 47, No. 1, pp. 87-100, 2008, doi: 10.1147/sj.471.0087. (Year: 2008) (Year: 2008).*

A. L. Nsakanda, M. Diaby and Y. Cao, "A Predictive Model of Redemption and Liability in Loyalty Reward Programs Industry," 2010 43rd Hawaii International Conference on System Sciences, 2010, pp. 1-11, doi: 10.1109/HICSS.2010.27. (Year: 2010).*

International Patent Application No. PCT/US2021/057234; Int'l Search Report and the Written Opinion; dated Jan. 28, 2022; 9 pages.

European Patent Application No. 21887595.3; Extended Search Report; dated Jun. 28, 2024; 9 pages.

* cited by examiner

SYSTEMS, METHODS, AND APPARATUSES FOR MULTI-TIERED ELECTRONIC PLATFORMS FOR ELECTRONIC MARKETPLACES

CROSS-REFERENCE TO RELATED APPLICATIONS

This application is the National Stage Application of International Patent Application No. PCT/US2021/057234, filed Oct. 29, 2021, which claims the benefit of U.S. Provisional Patent Application No. 63/107,939, filed on Oct. 30, 2020, entitled "Multi-Tiered Electronic Marketplace," the contents of which are hereby incorporated by reference herein in its entirety.

TECHNICAL FIELD

The present disclosure relates generally to methods, apparatuses, and computer program products for improving the functionality of electronic platforms for electronic marketplaces.

BACKGROUND

Electronic marketplaces are typically operated in conjunction with electronic platforms that may connect consumers and merchants. Merchants may access the electronic marketplace to sell their products or services to the customers of the electronic marketplace. Consumer transactions may be processed by the electronic marketplace and fulfilled by the merchants. Customers may utilize an application in communications with the electronic platform to search for products and services available for purchase using, for example, a search criterion. Upon finding a product or service desired, customers may use the application to purchase the product or service from the electronic marketplace.

SUMMARY

A method, apparatus and computer program product are therefore provided for providing improved techniques for conducting transactions via an electronic marketplace platform, as described more fully below.

The present disclosure is directed to an apparatus having a processor and a memory coupled with the processor. The processor may effectuate operations including receiving a search from a user device for one or more products or services provided via an electronic marketplace platform. The processor may further effectuate operations including transmitting search results of the search to the user device. The processor may further effectuate operations including receiving a selection of one or more products or services associated with the results of the search from the user device. The processor may further effectuate operations including conducting, via the electronic marketplace platform, a transaction for the selected one or more products or services. The processor may further effectuate operations including calculating, via the electronic marketplace platform, a service fee for the transaction. The processor may further effectuate operations including determining, via the electronic marketplace platform, whether one or more referees facilitated the transaction. The processor may further effectuate operations including calculating, via the electronic marketplace platform, a referral fee from the service fee when one or more referees facilitated the transaction. The processor may further effectuate operations including determining, via the electronic marketplace platform, a level assigned to each of the one or more referees and a predetermined referral fee percentage for the level assigned to each of the one or more referees. The processor may further effectuate operations including remitting, via the electronic marketplace platform, an electronic payment of at least a portion of the referral fee to each of the one or more referees based on the predetermined referral fee percentage for the level assigned to each of the one or more referees.

In one example embodiment, an apparatus may include at least one processor and a memory including computer program code instructions. The memory and computer program code instructions are configured to, with at least one processor, cause the apparatus to at least perform operations including transmitting search results of a search to a user device in response to receiving a search request from the user device for one or more products or services associated with an electronic marketplace platform. The memory and computer program code are also configured to, with the processor, cause the apparatus to receive a selection, from the user device, of one or more products or services associated with the search results. The memory and computer program code are also configured to, with the processor, cause the apparatus to determine a service fee for a transaction associated with the selected one or more products or services. The memory and computer program code are also configured to, with the processor, cause the apparatus to determine at least one referral fee, based on the service fee, in response to determining that one or more entities referred the products or services associated with the transaction. The memory and computer program code are also configured to, with the processor, cause the apparatus to determine at least one level assigned to each of the one or more entities and at least one predetermined referral fee percentage, based on the service fee, for the at least one level assigned to each of the one or more entities.

In another example embodiment, a method may include transmitting search results of a search to a user device in response to receiving a search request from the user device for one or more products or services associated with an electronic marketplace platform. The method may further include receiving a selection, from the user device, of one or more products or services associated with the search results. The method may further include determining a service fee for a transaction associated with the selected one or more products or services. The method may further include determining at least one referral fee, based on the service fee, in response to determining that one or more entities referred the products or services associated with the transaction. The method may further include determining at least one level assigned to each of the one or more entities and at least one predetermined referral fee percentage, based on the service fee, for the at least one level assigned to each of the one or more entities.

In yet another example embodiment, a computer program product may include at least one computer-readable storage medium having computer-executable program code instructions stored therein. The computer-executable program code instructions may include program code instructions configured to transmit search results of a search to a user device in response to receiving a search request from the user device for one or more products or services associated with an electronic marketplace platform. The computer program product may further include program code instructions configured to receive a selection, from the user device, of one or more products or services associated with the search results. The computer program product may further include program code instructions configured to determine a service fee for a transaction associated with the selected one or more products or services. The computer program product may further include program code instructions configured to determine at least one referral fee, based on the service fee, in response to determining that one or more entities referred the products or services associated with the transaction. The computer program product may further include program code instructions configured to determine at least one level assigned to each of the one or more entities and at least one predetermined referral fee percentage, based on the service fee, for the at least one level assigned to each of the one or more entities.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
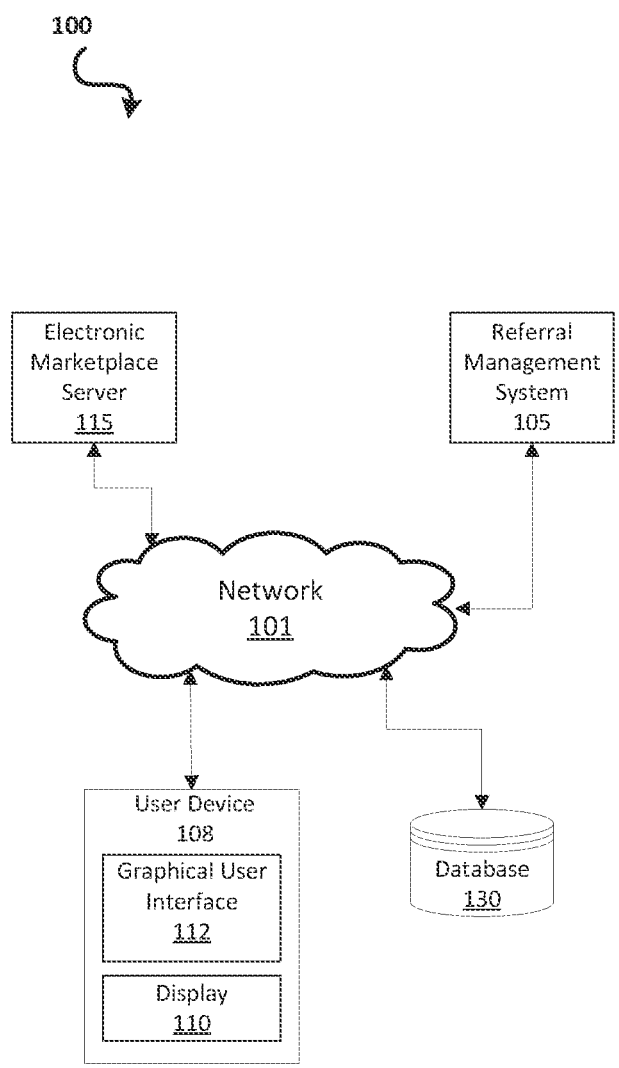
FIG. 1 is a schematic block diagram of a system according to an exemplary embodiment of the present disclosure.

Some embodiments of the present disclosure will now be described more fully hereinafter with reference to the accompanying drawings, in which some, but not all embodiments of the present disclosure are shown. Indeed, various embodiments of the present disclosure may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received, and/or stored in accordance with embodiments of the present disclosure. Moreover, the term "exemplary", as used herein, is not provided to convey any qualitative assessment, but instead merely to convey an illustration of an example. Thus, use of any such terms should not be taken to limit the spirit and scope of embodiments of the present disclosure.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a "referral network" may refer to direct referrals or indirect referrals that are linked or associated with a middleman or any intermediary that connects various merchants to consumers to facilitate sales of products or services.

As referred to herein, "E-commerce" may refer to any transaction of goods and/or services conducted over a network such as, for example, the Internet.

As referred to herein, an "electronic platform" may refer to any electronic platform for conducting E-commerce between one or more customers and one or more merchants over a network (e.g., business to business, business to consumer, business to business, consumer to business, etc.). For example, businesses, which may be referred to herein as merchants, may include Airbnb™, Uber™, Lyft™, Amazon™, Alibaba™, eBay™, Facebook™, or any other E-commerce electronic platform.

As referred to herein, an "application" may refer to a computer software package that performs a specific function for an end user or, in some cases, for another application. Applications may use a computer's operating system (OS) and other supporting programs to function. Applications may request services from and communicate with other technologies via an application programming interface (API).

As referred to herein, "multi-level marketing component" may refer to employing a secondary network of middlemen and intermediaries who make referral to consumers to buy products and/or services from merchants. Multiple middlemen and intermediaries may make referral to other consumers or middlemen to facilitate a purchase of a product or service. The middlemen and intermediaries may also make referrals to merchants or vice versa. The middlemen and intermediaries may also help merchants with the facilitation of the sale of the products and/or services. The middlemen and intermediaries may earn a referral fee(s) based on products and/or services purchased due to an associated referral(s).

As referred to herein, a "service fee" may refer to a percentage of a purchase bill added to the purchase bill for facilitating the purchase of a product or service.

As referred to herein, a "referee" and/or "referees" may refer to one or more users (e.g., customers, merchants, buyers, sellers, etc.) which referred one or more products, goods and/or services associated with a transaction(s). As referred to herein, "referee" and/or "referees" may be referred to herein interchangeably as "entity" and/or "entities".

It is to be understood that the methods and systems described herein are not limited to specific methods, specific components, or to particular implementations. It is also to be understood that the terminology used herein is for the purpose of describing particular exemplary embodiments only and is not intended to be limiting.

Many conventional electronic platforms allow for products and services to be exchanged between a consumer and merchant via an application. However, these electronic platforms may fail to provide additional functionality that allows multi-level referral fees to be provided to middlemen or intermediaries when facilitating a sale of products and services between the consumer and merchant. In some conventional multi-level marketing business models, direct sales companies may encourage existing distributors to recruit new distributors by paying the existing distributors a percentage of the new distributors' sales as a commission fee. However, some of these conventional multi-level marketing business models may fail to provide additional functionality that facilitate the sale of products and services or allows referral fees to be provided to middlemen or intermediaries when facilitating a sale (e.g., a transaction) of products and services between the consumer and merchant. In some existing business models, a service fee may be determined based on, for example, a difference between a wholesale price and a retail price (e.g., a commission fee). Because conventional electronic platforms may fail to consider multiple levels when determining referral fees and multi-level marketing business models may fail to consider referral fees based on a transaction (e.g., a sale of a product or service), existing platforms and existing business models may not possess the ability to compute multiple referral fees for parties on multiple levels of a marketing platform in response to one or more transactions occurring.

Furthermore, since some conventional electronic platforms typically may fail to consider multiple levels when determining referral fees for transactions, these conventional electronic platforms typically determine the difference between the wholesale price and the retail price as a commission fee, for example, to the new distributor for their sales provided on behalf of the existing distributor (as described above), each instance in which such sales occur, for example, in a brute force manner (e.g., determining one-by-one). Determining such a single commission fee in this brute force manner, for example, by evaluating sales one-by-one between only the new distributor and the existing distributor, without simultaneously considering whether other parties associated with the same sales may be entitled to a referral fee, may inefficiently consume processing capacity and memory capacity of a computing device. For example, a computing device may need to evaluate multiple rounds of sales (and store such data in memory devices) associated with the new distributor and the existing distributor by determining the difference between the wholesale price and the retail price to determine if a single commission fee is due to the new distributor. Such evaluation of multiple rounds of sales by a computing device for determining a single referral fee to one party, for example, the new distributor, may have a high computation cost and as such may constrain processing resources of the computing device and may also constrain the memory capacity of memory devices storing the data associated with the sales for evaluation.

Systems, methods, and apparatuses of the exemplary embodiments are described for electronic platforms for electronic marketplaces. The electronic platforms associated with the electronic marketplaces may be used to facilitate transactions for products and/or services, which may include collecting charges as a referral fee(s) from a seller (e.g., a merchant), a buyer (e.g., a customer) or both. The electronic platforms associated with the electronic marketplaces of the exemplary embodiments may determine a distribution of the referral fee(s) based on evaluating one or more assigned levels of entities associated with a multi-level referral data structure, associated with a same transaction, that may facilitate determination (e.g., concurrently) by a computing device of all or a portion of a referral fee(s) for multiple entities/individuals referring products and/or services to the buyer, seller or both that may vary based on the level at which the referring entity/individual has in the multi-level referral data structure. By analyzing, in real-time, the multi-level referral data structure to determine (e.g., concurrently) a referral fee(s) due to multiple entities associated with a same transaction(s), the exemplary embodiments may conserve processing capacity of computing devices and memory capacity of memory devices by minimizing a need to make multiple evaluations of multiple rounds of sales for determining a referral fee only to one party and by minimizing a need to store such associated sales data in memory devices.

As such, systems in accordance with various exemplary embodiments of the invention provide specific technical solutions to technical problems faced by some systems.

General System Architecture

Referring to FIG. 1, a system 100 may include a referral management system 105 (e.g., a server), an electronic marketplace server 115, and a database 130. The system 100 may also include a user device 108 configured with a display 110 and a graphical user interface 112. The referral management system 105, the electronic marketplace server 115, the database 130, and the user device 108 may be in communication with each other via a network 101. The network 101 may include a wide area network (WAN), such as the Internet, a local area network (LAN), such as, for example, a wireless local area network (WLAN), or other types of networks.

The electronic marketplace server 115 may provide an electronic marketplace platform that enables transactions between merchants and customers in order to buy or sell products or services. For example, a merchant (e.g., Airbnb™) may facilitate a transaction with a customer to book a room using an application (e.g., Airbnb™ website or Airbnb™ app) to enter payment information. This transaction may also include a service fee (e.g., 10% of a booking fee for the room) for booking the room on the electronic marketplace. Accordingly, if a customer books a room for $100, the service fee would be $10.

The referral management system 105 may be associated with the electronic marketplace server 115. For example, the referral management system may be managed by an owner of the electronic marketplace server 115 or a third party (e.g., an intermediary) facilitating a transaction via the electronic marketplace server 115. The referral management system 105 may access or update a multi-level referral data structure, which may be stored in database 130. When updating the multi-level referral data structure, the referral management system 105 may add and/or remove potential referees or levels associated with the multi-level referral data structure.

Accordingly, when a transaction for a sale of products or services between a merchant (e.g., Amazon™, Uber™, eBay™, Airbnb™, etc.) and a customer occurs via one or more user devices 108 connected to the electronic marketplace server 115, the referral management system 105 may receive a service fee calculated by the electronic marketplace server 115. The referral management system 105 may access the multi-level referral data structure to determine, using at least one processor of the referral management system 105, whether one or more customers or merchants in a referral network of the customer (hereinafter referees) has made a referral (e.g., a referral, a referral of a referral, a referral of a referral of a referral, etc.) to the customer regarding the product(s) and/or service(s) included in the transaction. The referral management system 105 may traverse, using at least one processor of the referral management system 105, and analyze the multi-level referral data structure to determine one or more referees within the multi-level referral data structure that are eligible to receive a referral fee (e.g., an actual referee) for facilitating the transaction by making a referral. The referral fee may be all of the service fee or a portion thereof.

For example, a customer may use an application to book a room via a hoteling or real estate rental company (e.g., Airbnb™) for $100 via the electronic marketplace server 115. The electronic marketplace server 115 may also collect a service fee for the booking of the room (e.g., a 10% fee-$10 for this transaction). For a booking transaction of this type, 40% of the service fee (e.g., $4) may be determined by the electronic marketplace server 115 as a referral fee. The electronic marketplace server 115 may traverse a multi-level referral data structure stored in database 130, using at least one processor of the electronic marketplace server 115, to determine whether one or more potential referees in the multi-level referral data structure provided referrals facilitating booking of the room. For example, if four referees facilitated the booking, each of which may reside on a same or different level of the multi-level referral data structure, the referral management system 105 may utilize a predetermined percentage associated with each level of the multi-level referral data structure to apportion the referral fee. For example, if the referral fee is to be apportioned by four referees being designated on four different levels of the multi-level referral data structure, the referee on level one may receive 50% of the referral fee (e.g., $2), the referee on level two may receive 25% of the referral fee (e.g., $1), the referee on level three may receive 15% of the referral fee (e.g., $0.6), and the referee on level four may receive 10% of the referral fee (e.g., $0.4). Accordingly, when a transaction involves multiple referrals from referees on the same or different levels of a multi-level referral data structure, the referral fee associated with the transaction may be distributed to the referees accordingly to a predetermined percentage assigned to each level of the multi-level referral data structure. The referral fee or portion thereof may be remitted to each referee via, for example, a wire transfer or another manner of transmitting funds into an account associated with the referee. The remittance may be based on banking details associated with the referee.

The database 130 may store the multi-level referral data structure, predetermined percentages assigned to each level of the multi-level referral data structure, customer data for one or more customers, banking details for one or more potential referees, as well as data associated with products and services for one or more merchants. The multi-level referral data structure may be a data structure such as, for example, a tree data structure. The multi-level referral data structure may be a collection of nodes connected by directed or undirected edges. The tree data structure may include a root node and one or more subtree nodes. Each node may indicate a potential referee for a transaction. The root node may indicate a customer or merchant that has directly referred a product(s) and/or service(s) to another customer or merchant in which the transaction has occurred. For example, the multi-level referral data structure may include at least two levels in which each level has at least one node. The database 130 may store the multi-level referral data structure for one or more merchants.

The user device 108 may include, for example, a personal computer, a laptop computer, or a mobile device. The user device 108 may include a display 110, and a graphical user interface 112. In some example embodiments, data (e.g., transaction data, referral data, service fee data, referral fee data, etc.) may be provided to the graphical user interface 112 (e.g., for presentation/output) by the referral management system 105, the electronic marketplace server 115, or the database 130. In some example embodiments, the user device 108 may use an application running on the user device 108 to conduct a transaction between a merchant and customer via the electronic marketplace server 115.

The graphical user interface 112 may include a user input interface. In some example embodiments, the user input interface may detect input and/or a selection of a request (e.g., by a customer) for information relating to a transaction between a merchant and the customer conducted via an electronic marketplace platform to acquire products or services. In some other example embodiments, the user input interface of the graphical user interface 112 may detect input or a selection related to conducting transactions via the electronic marketplace platform and providing a referral fee to one or more actual referees for a referral(s) related to the transaction.

Computing Device

Figure 2:
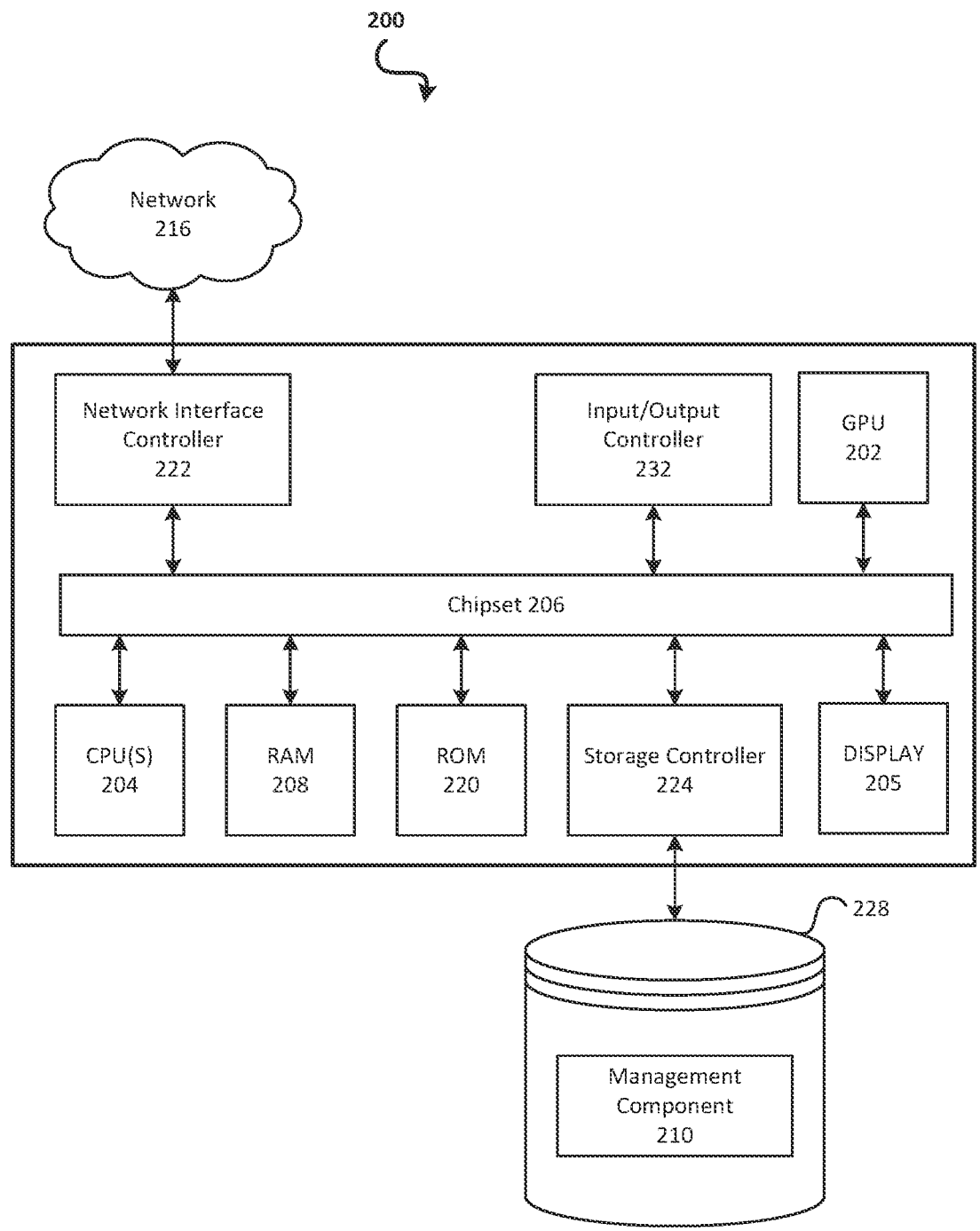
FIG. 2 is a block diagram illustrating an example computing device according to an exemplary embodiment of the present disclosure.

FIG. 2 depicts a computing device that may be used in various aspects, such as the servers, modules, or devices depicted in FIG. 1. With regard to the example architecture of FIG. 1, the referral management system 105, the electronic marketplace server 115, and/or the database 130, and user device 108 may each be implemented in an instance of a computing device 200 of FIG. 2. The computer architecture shown in FIG. 2 may illustrate a server computer, workstation, desktop computer, laptop, tablet, network appliance, personal data assistant (PDA), e-reader, digital cellular phone, or other computing node, and may be utilized to execute any aspects of the computers described herein, such as to implement the methods described herein.

The computing device 200 may include a baseboard, or "motherboard," which may be a printed circuit board to which a multitude of components or devices may be connected by way of a system bus or other electrical communication paths. One or more central processing units (CPUs) 204 may operate in conjunction with a chipset 206. The CPU(s) 204 may be standard programmable processors that perform arithmetic and logical operations necessary for the operation of the computing device 200.

The CPU(s) 204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 204 may be augmented with or replaced by other processing units, such as GPU(s) 202. The GPU(s) 202 may comprise processing units specialized for but not necessarily limited to highly parallel computations, such as graphics rendering and other visualization-related processing. In some examples, the GPU 202 may render a user interface(s), which may detect input (e.g., selections of a user) and present/output visible indicia.

A chipset 206 may provide an interface between the CPU(s) 204 and the remainder of the components and devices on the baseboard. The chipset 206 may provide an interface to a random-access memory (RAM) 208 used as the main memory in the computing device 200. The chipset 206 may further provide an interface to a computer-readable storage medium, such as a read-only memory (ROM) 220 or non-volatile RAM (NVRAM) (not shown), for storing basic routines that may help to start up the computing device 200 and to transfer information between the various components and devices. ROM 220 or NVRAM may also store other software components necessary for the operation of the computing device 200 in accordance with the aspects described herein.

The computing device 200 may operate in a networked environment using logical connections to remote computing nodes and computer systems through a network 216 (e.g., a local area network (LAN), Internet, etc.). The chipset 206 may include functionality for providing network connectivity through a network interface controller (NIC) 222, such as a gigabit Ethernet adapter. A NIC 222 may be capable of connecting the computing device 200 to other computing nodes over a network 216. It should be appreciated that multiple NICs 222 may be present in the computing device 200, connecting the computing device to other types of networks and remote computer systems.

The computing device 200 may be connected to a mass storage device 228 that provides non-volatile storage for the computer. The mass storage device 228 may store system programs, application programs, other program modules, and data, which are described in greater detail herein. The mass storage device 228 may be connected to the computing device 200 through a storage controller 224 connected to the chipset 206. The mass storage device 228 may consist of one or more physical storage units. A storage controller 224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 200 may store data on a mass storage device 228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 228 is characterized as primary or secondary storage and the like.

For example, the computing device 200 may store information to the mass storage device 228 by issuing instructions through a storage controller 224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 200 may further read information from the mass storage device 228 by detecting the physical states or characteristics of one or more particular locations within the physical storage units.

In addition to the mass storage device 228 described above, the computing device 200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 200.

By way of example and not limitation, computer-readable storage media may include volatile and non-volatile, transitory computer-readable storage media and non-transitory computer-readable storage media, and removable and non-removable media implemented in any method or technology. Computer-readable storage media may include, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 228 depicted in FIG. 2, may store an operating system utilized to control the operation of the computing device 200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 228 may store other system or application programs and data utilized by the computing device 200.

The mass storage device 228 or other computer-readable storage media may also be encoded with computer-executable instructions, which, when loaded into the computing device 200, transforms the computing device from a general-purpose computing system into a special-purpose computer capable of implementing the aspects described herein. These computer-executable instructions transform the computing device 200 by specifying how the CPU(s) 204 transition between states, as described above. The computing device 200 may have access to computer-readable storage media storing computer-executable instructions, which, when executed by the computing device 200, may perform methods described herein.

A computing device, such as the computing device 200 depicted in FIG. 2, may also include an input/output controller 232 for receiving and processing input from a number of input devices, such as a keyboard, a mouse, a touchpad, a touch screen, an electronic stylus, or other type of input device. Similarly, an input/output controller 232 may provide output to a display 205, such as a computer monitor, a flat-panel display, a digital projector, a printer, a plotter, or other type of output device. It will be appreciated that the computing device 200 may not include all of the components shown in FIG. 2, may include other components that are not explicitly shown in FIG. 2, or may utilize an architecture completely different than that shown in FIG. 2.

As described herein, a computing device may be a physical computing device, such as the computing device 200 of FIG. 2. A computing node may also include a virtual machine host process and one or more virtual machine instances. Computer-executable instructions may be executed by the physical hardware of a computing device indirectly through interpretation and/or execution of instructions stored and executed in the context of a virtual machine.

Exemplary System Operation

Exemplary embodiments of the present disclosure may provide an electronic marketplace platform that enables transactions between merchants and customers in order to buy or sell products or services. When a transaction is conducted, the electronic marketplace platform may also determine one or more referees that facilitated the transaction by referring the customer to the merchant. The one or more referees may be stored in a multi-level referral data structure which stores referees on different levels (e.g., a direct referral being level 1, a referral of a referral being level 2, a referral of a referral of a referral being level 3, etc.). Upon a determination of the one or more referees that facilitated the transaction, the electronic marketplace platform may remit a referral fee to each of the one or more referees via, for example, an electronic payment (e.g., a wire transfer).

Figure 3:
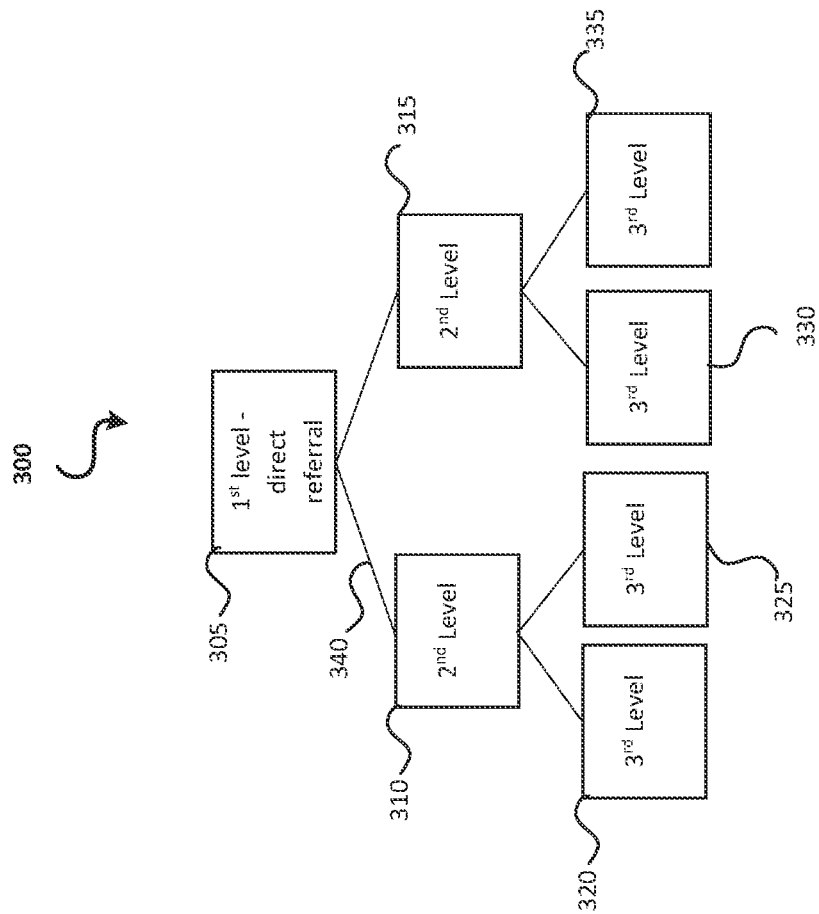
FIG. 3 is an exemplary multi-level referral data structure in accordance with an exemplary embodiment of the present disclosure.

Referring now to FIG. 3, a diagram illustrating a multi-level referral data structure 300 according to an example embodiment is provided. The multi-level referral data structure 300 may be a structure having at least two nodes (e.g., 305, 310, 315, 320, 325, 330, and 335) and at least one edge (e.g., 340). Each node may reflect an individual or merchant within a customer's referral network capable of making a referral for a product or service. Each edge may connect two nodes further indicating a referral relationship between the two nodes.

The multi-level referral data structure 300 may store referral data indicating a direct relationship between the customer and a direct referee 305 (also referred to herein as direct referral 305) (e.g., a merchant, a buyer, a seller, etc.). For example, the referral data may include referee identification (ID) information (e.g., name, unique ID, tax ID, business ID, etc.) for each referee. In addition, the referral data may indicate, for example, a familial relationship, a friendship, a business relationship or another relationship between the customer and referee.

On a separate level (e.g., first level), the multi-level referral data structure 300 may store referral data indicating a first level relationship between the direct referee and a first level referee. On a separate level (e.g., second level), the multi-level referral data structure 300 may store referral data indicating a second level relationship between the first level referee and a second level referee. On a separate level (e.g., third level), the multi-level referral data structure 300 may store referral data indicating a third level relationship between the second level referee and a third level referee. Accordingly, the multi-level referral data structure 300 may also store relationships (e.g., edge, a link, pointer, etc.) between each referee and another referee residing on a level above or below the referee. The multi-level referral data structure 300 may also include additional levels (e.g., fourth level, fifth level, sixth level, seventh level, etc.).

Figure 4:
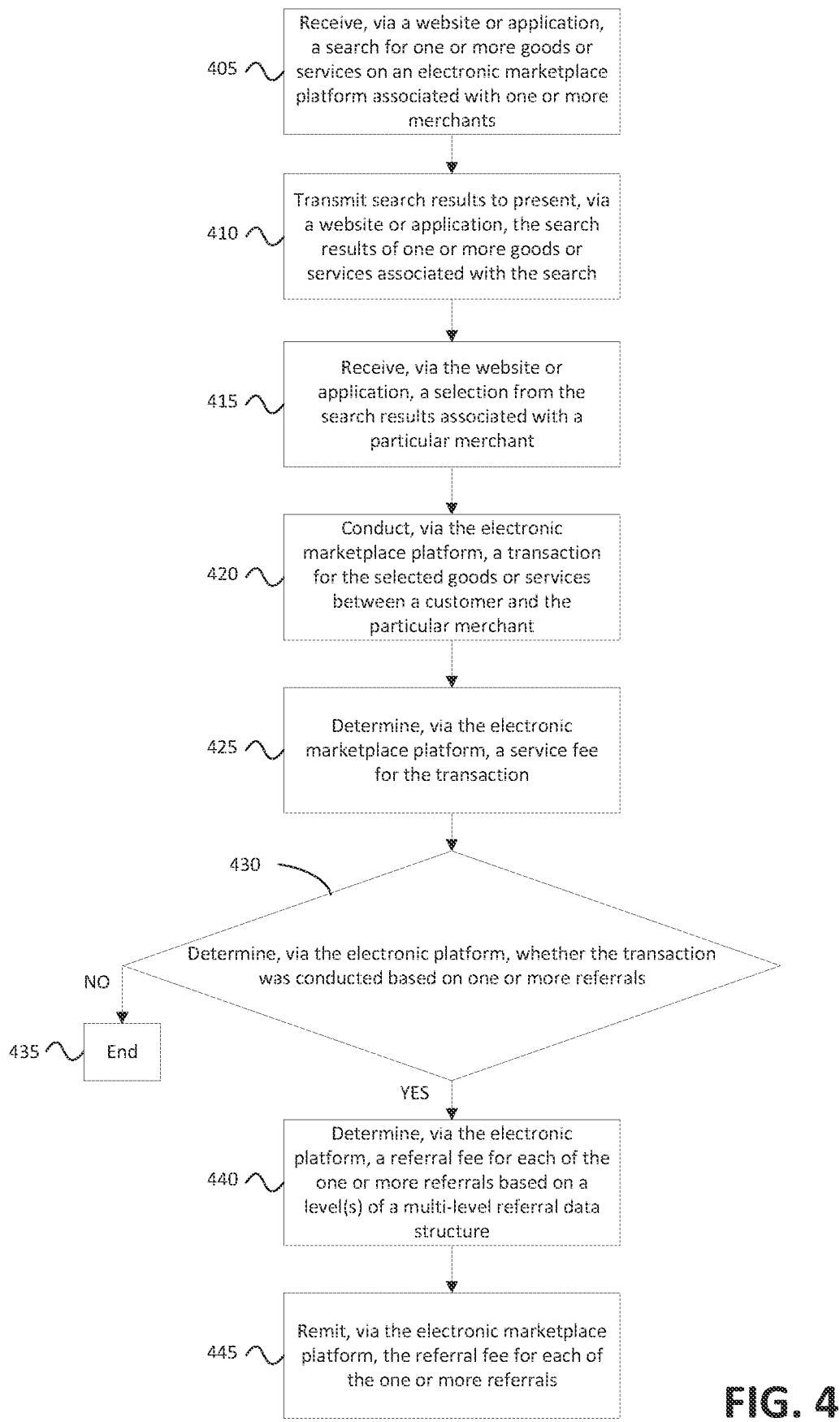
FIG. 4 is a flow diagram of an exemplary method according to an exemplary embodiment of the present disclosure.

FIG. 4 is a flowchart of an example method 400 for determining referrals according to one or more exemplary embodiments. At block 405, an electronic marketplace platform (e.g., electronic marketplace server 115) electronically coupled to a user device 108 having a graphical interface 112 and display 110 may receive a search for one or more goods or services from a customer using a website or an application. At block 410, the electronic marketplace platform may transmit search results of the search to the user device 108 for presentation via display 110. At block 415, the electronic marketplace platform may receive a selection (e.g., from the customer) of good or services for at least one merchant associated with the search results from the user device 108.

At block 420, in response to the selection of goods or services via the user device 108, the electronic marketplace platform may conduct or otherwise facilitate a transaction between the customer and at least one merchant for the selected goods or services. At block 425, the electronic marketplace platform may determine a service fee based on the transaction.

At block 430, in response to conducting the transaction, the electronic marketplace platform may access transaction details, which may include information indicating one or more referees that have made referrals to facilitate the transaction, to determine whether one or more referees facilitated the transaction between the customer and merchant. If no referees facilitated the transaction between the customer and merchant, the method proceeds to block 435 and ends.

If the electronic marketplace platform determines that one or more referees facilitated the transaction between the customer and merchant, the method proceeds to block 440 where the electronic marketplace platform may access a multi-level referral data structure (e.g., multi-level referral data structure 300) stored in a database (e.g., database 130) to determine a direct or indirect referral relationship between the one or more referees and which level (e.g., direct, first level, second level, etc.) within the multi-level referral data structure the one or more referees reside. Based on the determined referral relationship and level of the one or more referees, the electronic marketplace platform may determine a referral fee for each of the one or more referees based on a level associated with each of the one or more referees. At block 445, the electronic marketplace platform may remit the referral fee to each of the one or more referees that facilitated the transaction. For example, the electronic marketplace platform may obtain banking information for each of the one or more referees and may perform an electronic payment (e.g., a wire transfer) of the referral fee or portion thereof to each of the one or more referees that facilitated the transaction.

Accordingly, methods, apparatuses and systems disclosed herein may be directed to an electronic marketplace platform that enables transactions between merchants and customers in order to buy or sell products or services. A website or application may be used by the customers and merchants to interact with the electronic marketplace platform in order to conduct the transaction. The electronic marketplace platform may access a multi-level referral data structure when conducting the transactions. The multi-level referral data structure may include at least two levels (e.g., two or more levels). A predetermined referral fee percentage may be assigned to each level, which may be the same percentage for each level.

The electronic marketplace platform (also referred to herein as electronic platform) may be operated by a middleman/intermediary that may connect various suppliers to consumers (e.g., Uber™ and/or Airbnb™). The middleman/intermediary may charge a fee for connecting suppliers to consumers. The electronic platform may be used to distribute the fee charged for the connection to referees that helped facilitate the transaction via, for example, an electronic payment.

For purposes of illustration and not of limitation, as an example, Airbnb™ may charge a guest $100 to book a room using the electronic platform. Because the electronic platform may be operated by a middleman/intermediary, the booking of the room may include an additional charge (e.g., a 10% service fee). A predetermined percentage (e.g., 40%) of the service fee (e.g., 10% of $100=$10) may be dedicated to people that helped facilitate the transaction by referring the guest to the room booked through Airbnb™. Accordingly, $4 (e.g., 40% of $10=$4), of the $10 service fee may be distributed to referees of the booking. Depending on the number of referees and a relational level for each referee, the $4 may be further divided based on a predetermined percentage assigned to each level. For example, a referee that directly refers a referee to a guest (e.g., level 1 or direct referral) may receive 50% of the $4 referral fee (e.g., $2), a referee that makes referral via the direct referee to a guest (e.g., level 2) may receive 25% of the $4 referral fee (e.g., $1), a referee that makes a referral via a level 2 referee and the direct referee to a guest (e.g., level 3) may receive 15% of the $4 referral fee (e.g., $0.6), a referee that makes referral through a level 3 referee, via a level 2 referee and the direct referee to a guest (level 4) may receive 10% of the $4 referral fee (e.g., $0.4).

Figure 5:
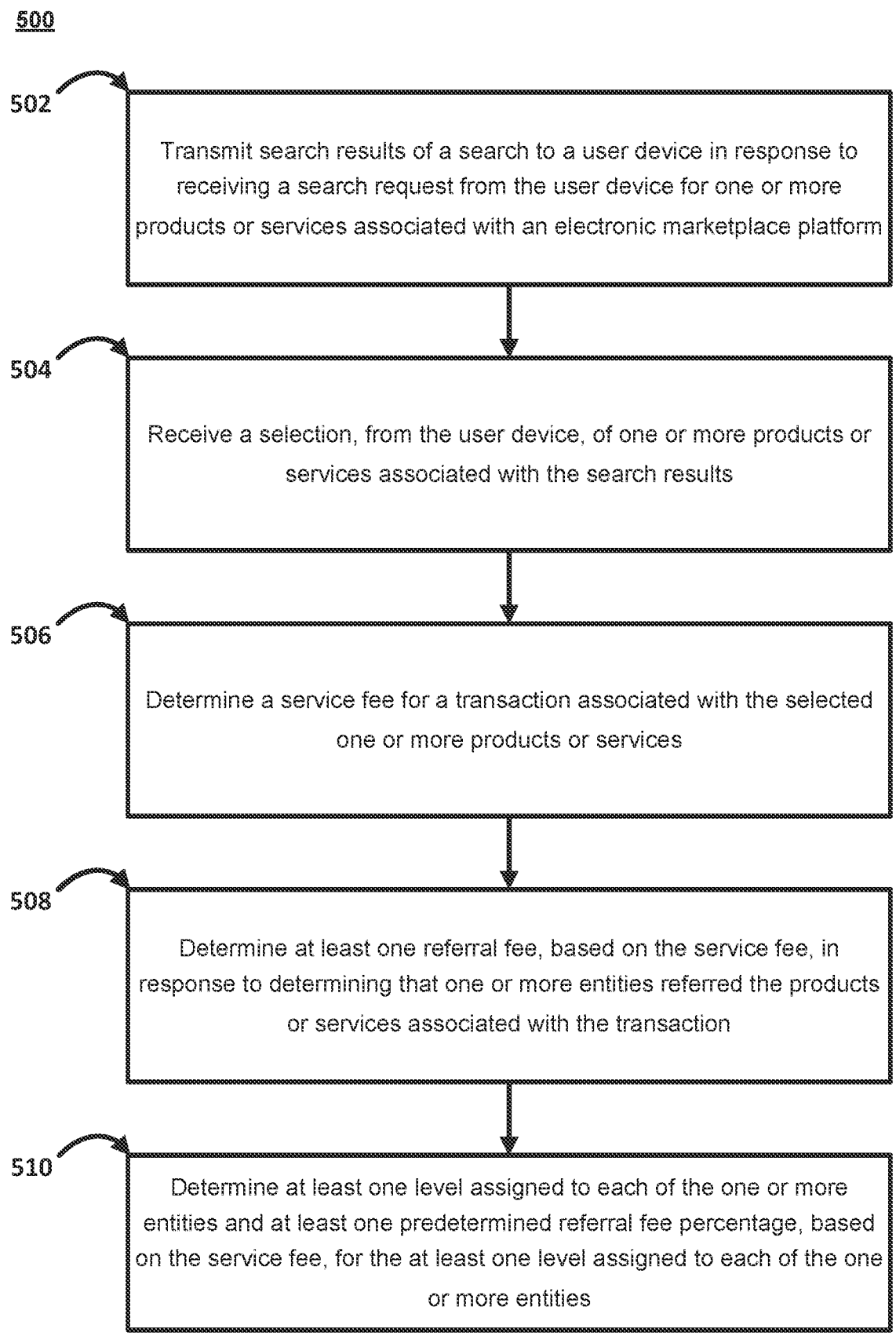
FIG. 5 illustrates an example flowchart illustrating operations for another exemplary method according to an exemplary embodiment of the present disclosure.

FIG. 5 illustrates an example flowchart illustrating operations for a method 500 according to an exemplary embodiment. At step 502, an apparatus (e.g., referral management system 105, electronic marketplace server 115) may transmit search results of a search to a user device (e.g., user device 108). The apparatus may transmit the search results to the user device in response to receiving a search request from the user device for one or more products or services associated with an electronic marketplace platform.

At step 504, an apparatus (e.g., referral management system 105, electronic marketplace server 115) may receive a selection, from the user device, of one or more products or services associated with the search results. At step 506, an apparatus (e.g., referral management system 105, electronic marketplace server 115) may determine a service fee for a transaction associated with the selected one or more products or services.

At step 508, an apparatus (e.g., referral management system 105, electronic marketplace server 115) may determine at least one referral fee, based on the service fee. The apparatus may determine the at least one referral fee in response to determining that one or more entities (e.g., referees) referred the products or services associated with the transaction.

At step 510, an apparatus (e.g., referral management system 105, electronic marketplace server 115) may determine at least one level assigned to each of the one or more entities and at least one predetermined referral fee percentage, based on the service fee, for the at least one level assigned to each of the one or more entities. The apparatus may determine the referral fee associated with each of the one or more entities based on the predetermined referral fee percentage (e.g., 50%, 25%, etc.) associated with the at least one level(s) (e.g., level 1, level 2, etc.) assigned to each of the one or more entities. The apparatus may remit an electronic payment of at least a portion (e.g., $2, $1, $0.6, $0.4) of the determined referral fee (e.g., $4) to each of the one or more entities based on the predetermined referral fee percentage associated with the at least one level(s) (e.g., level 1, level 2, level 3, level 4, etc.) assigned to each of the one or more entities.

CONCLUSION

Many modifications and other embodiments of the present disclosures set forth herein will come to mind to one skilled in the art to which these present disclosures pertain having the benefit of the teachings presented in the foregoing descriptions and the associated drawings. Therefore, it is to be understood that the present disclosures are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. An apparatus comprising:
at least one processor; and
a memory coupled with the processor, the memory comprising computer-executable instructions stored thereon which when executed by the at least one processor, cause the apparatus to:
  access a multi-level referral data structure, based on an electronic transaction, wherein:
    the multi-level referral data structure defines a level assigned to a plurality of entities,
    the plurality of entities comprises a first entity and a second entity, the first entity corresponds with a first product or first service, the second entity corresponds with a second product or second service,
    the electronic transaction has a corresponding service fee and the electronic transaction is associated with a purchase of a selection of one or more products or services associated with a search result, received via a user device, wherein the service fee is added to a bill of the purchase of the one or more products or services; and
    the service fee is added to the bill for the electronic transaction of the one or more products or services,
  determine, based on the electronic transaction, the first entity of the multi-level referral data structure, and the second entity of the multi-level referral data structure;
  determine, based on the multi-level referral data structure and the service fee, a first referral fee associated with a level assigned to the first entity and a second referral fee associated with a level assigned to the second entity, wherein the level assigned to the first entity is associated with a first referral fee percentage and the level assigned to the second entity is associated with a second referral fee percentage; and
  transmit an electronic payment, via an electronic marketplace, of the first referral fee to a first account associated with the first entity and the second referral fee to a second account associated with the second entity, wherein the first referral fee corresponds to the service fee and the first referral fee percentage associated with the level of the first entity, wherein the second referral fee corresponds to the service fee and the second referral fee percentage associated with the level of the second entity.

2. The apparatus of claim 1, wherein the service fee is charged to a purchaser associated with one or more products or services.

3. The apparatus of claim 1, wherein the first entity corresponds with a first referee that referred one or more products or services associated with the electronic transaction, and the second entity corresponds with a second referee that referred one or more products or services associated with the electronic transaction.

4. The apparatus of claim 3, wherein the multi-level referral data structure is configured to store data indicating a relationship between one or more customers, sellers or buyers associated with the transaction and each of the one or more entities.

5. The apparatus of claim 1, wherein the at least one level assigned to a third entity of the one or more entities is associated with a third level assigned a third predetermined referral fee percentage.

6. The apparatus of claim 1, wherein the at least one level assigned to a fourth entity of the one or more entities is associated with a fourth level assigned a fourth predetermined referral fee percentage.

7. The apparatus of claim 1, wherein the electronic marketplace platform is operated by an intermediary to the transaction.

8. A method comprising:
accessing a multi-level referral data structure, based on an electronic transaction, wherein:
the multi-level referral data structure defines a level assigned to a plurality of entities,
the plurality of entities comprises a first entity and a second entity, the first entity corresponds with a first product or first service, the second entity corresponds with a second product or second service,
the electronic transaction has a corresponding service fee and the electronic transaction is associated with a purchase of a selection of one or more products or services associated with a search result, received via a user device, wherein the service fee is added to a bill of the purchase of the one or more products or services; and
the service fee is added to the bill for the electronic transaction of the one or more products or services,
determining, based on the electronic transaction, the first entity of the multi-level referral data structure, and the second entity of the multi-level referral data structure;
determining, based on the multi-level referral data structure and the service fee, a first referral fee associated with a level assigned to the first entity and a second referral fee associated with a level assigned to the second entity, wherein the level assigned to the first entity is associated with a first referral fee percentage and the level assigned to the second entity is associated with a second referral fee percentage; and
transmitting an electronic payment, via an electronic marketplace, of the first referral fee to a first account associated with the first entity and the second referral fee to a second account associated with the second entity, wherein the first referral fee corresponds to the service fee and the first referral fee percentage associated with the level of the first entity, wherein the second referral fee corresponds to the service fee and the second referral fee percentage associated with the level of the second entity.

9. The method of claim 8, wherein the service fee is charged to a purchaser associated with one or more products or services.

10. The method of claim 8, wherein the first entity corresponds with a first referee that referred one or more products or services associated with the electronic transaction, and the second entity corresponds with a second referee that referred one or more products or services associated with the electronic transaction.

11. The method of claim 8, wherein the at least one level assigned to a third entity of the one or more entities is associated with a third level assigned a third predetermined referral fee percentage.

12. The method of claim 8, wherein the at least one level assigned to a fourth entity of the one or more entities is associated with a fourth level assigned a fourth predetermined referral fee percentage.

13. The method of claim 8, wherein the multi-level referral data structure is configured to store data indicating a relationship between one or more customers, sellers or buyers associated with the electronic transaction and each of the one or more entities.

14. The method of claim 8, wherein the electronic marketplace platform is operated by an intermediary to the transaction.

15. A computer program product comprising a computer readable storage medium having instructions encoded thereon which, when executed by a processor, cause:
access a multi-level referral data structure, based on an electronic transaction, wherein:
the multi-level referral data structure defines a level assigned to a plurality of entities,
the plurality of entities comprises a first entity and a second entity, the first entity corresponds with a first real estate service associated with a property, the second entity corresponds with a second real estate service associated with the property,
the electronic transaction has a corresponding service fee and the electronic transaction is associated with a purchase of a selection of a third real estate service associated with the property associated with a search result, received via a user device, wherein the service fee is added to a bill of the purchase of the third real estate service; and
the service fee is added to the bill for the electronic transaction of the third real estate service,
determine, based on the electronic transaction, the first entity of the multi-level referral data structure, and the second entity of the multi-level referral data structure;
determine, based on the multi-level referral data structure and the service fee, a first referral fee associated with a level assigned to the first entity and a second referral fee associated with a level assigned to the second entity, wherein the level assigned to the first entity is associated with a first referral fee percentage and the level assigned to the second entity is associated with a second referral fee percentage; and
transmit an electronic payment of the first referral fee to a first account associated with the first entity and the second referral fee to a second account associated with the second entity, wherein the first referral fee corresponds to the service fee and the first referral fee percentage associated with the level of the first entity, wherein the second referral fee corresponds to the service fee and the second referral fee percentage associated with the level of the second entity.

16. The computer program product of claim 15, wherein the service fee is charged to a purchaser associated with one or more products or services.

17. The computer program product of claim 16, wherein the first real estate service comprises a first short-term rental.

18. The computer program product of claim 16, wherein the second real estate service comprises a long-term rental.

19. The computer program product of claim 15, wherein the first real estate service comprises a first short-term rental.

\* \* \* \* \*